(12) United States Patent
Persico

(10) Patent No.: US 8,089,854 B2
(45) Date of Patent: Jan. 3, 2012

(54) COMPANDED TRANSMIT PATH FOR WIRELESS COMMUNICATION

(75) Inventor: Charles J. Persico, Rancho Santa Fe, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 806 days.

(21) Appl. No.: 11/695,773

(22) Filed: Apr. 3, 2007

(65) Prior Publication Data
US 2008/0247306 A1   Oct. 9, 2008

(51) Int. Cl.
*H04J 3/04* (2006.01)
(52) U.S. Cl. ............... 370/204; 370/535; 375/260
(58) Field of Classification Search .......... 370/535, 370/536–546, 204; 455/127, 72; 375/308, 375/260–261, 279–281, 284, 285, 295–298
See application file for complete search history.

(56) References Cited

U.S. PATENT DOCUMENTS

| | | | |
|---|---|---|---|
| 4,437,377 A | 3/1984 | Mitarai et al. | |
| 5,708,681 A * | 1/1998 | Malkemes et al. | 375/297 |
| 6,546,044 B1 * | 4/2003 | Dent | 375/216 |
| 6,831,942 B2 * | 12/2004 | Guo et al. | 375/142 |
| 6,906,996 B2 | 6/2005 | Ballantyne | |
| 6,973,141 B1 * | 12/2005 | Isaksen et al. | 375/308 |
| 7,142,609 B2 * | 11/2006 | Terreault et al. | 375/261 |
| 7,233,624 B2 * | 6/2007 | Kazakevich et al. | 375/243 |
| 7,340,228 B2 * | 3/2008 | Monroe et al. | 455/127.1 |
| 7,391,814 B2 * | 6/2008 | Kazakevich et al. | 375/243 |
| 7,430,254 B1 * | 9/2008 | Anderson | 375/342 |
| 7,471,926 B2 * | 12/2008 | Oga | 455/1 |
| 2002/0064233 A1 * | 5/2002 | Terreault et al. | 375/261 |
| 2003/0016761 A1 * | 1/2003 | Min | 375/298 |
| 2004/0127173 A1 * | 7/2004 | Leizerovich | 455/93 |
| 2007/0230598 A1 * | 10/2007 | Wang | 375/260 |
| 2008/0240259 A1 * | 10/2008 | Kazakevich et al. | 375/243 |
| 2009/0190699 A1 * | 7/2009 | Kazakevich et al. | 375/345 |

FOREIGN PATENT DOCUMENTS

| | | |
|---|---|---|
| EP | 1691487 A1 | 8/2006 |
| JP | 2002513540 T | 5/2002 |
| JP | 2002182700 A | 6/2002 |
| JP | 2005020693 A | 1/2005 |
| JP | 2005295537 A | 10/2005 |
| JP | 2005530385 T | 10/2005 |
| JP | 2006135612 A | 5/2006 |

(Continued)

OTHER PUBLICATIONS

International Search Report—PCT/US08/0508279, International Search Autority—European Patent Office—Nov. 20, 2008.

(Continued)

*Primary Examiner* — Chuong T Ho
(74) *Attorney, Agent, or Firm* — Kenyon S. Jenckes; Ramin Mobarhan

(57) ABSTRACT

This disclosure describes companded transmit path techniques that may be implemented in a wireless communication device to reduce power consumption and possibly simplify signal modulation. In accordance with this disclosure, in phase (I) and quadrature phase (Q) components of a transmit waveform are compressed at baseband, and an emphasis envelope is generated to represent this compression. The compressed I and Q components are then converted to analog signals and processed. This analog processing may include the mixing process in which the compressed I and Q signals are modulated onto a carrier waveform. The emphasis envelope signal is then used to expand the modulated waveform.

47 Claims, 4 Drawing Sheets

FOREIGN PATENT DOCUMENTS

JP    2007502577 T    2/2007

OTHER PUBLICATIONS

Naiqian Zhang et al: "A New Nonlinear Companding Method for Reducing Pea—to-Average Power Ratio of OFDM Signals" Antennas Propagation & EM Theory, 2006. ISAPE '06. 7th International Symposium on, IEEE, PI, Oct. 1, 2006, pp. 1-4, XP031080772.

Written Opinion—PCT/US08/0508279, International Search Autority—European Patent Office—Nov. 20,2008.

* cited by examiner

COMPANDED TRANSMIT PATH FOR WIRELESS COMMUNICATION

TECHNICAL FIELD

This disclosure relates to wireless communication and, more particularly, to transmission architectures for a wireless communication device.

BACKGROUND

A wide variety of modulation techniques exist for wireless communication. For example, many linear modulation techniques exist, such as various quadrature amplitude modulation (QAM) techniques. These include 16 QAM, 64 QAM, and others. Furthermore, many new linear modulation techniques will likely emerge.

Linear modulation is usually well suited to low output power regimes, but often tends to be noisy at high levels of output power. Therefore, at higher power levels, linear modulation may require substantial filtering or other processing to limit signal corruption. This processing can cause undesirable power usage and design complexity at the wireless transmitter.

Polar modulation is one alternative to linear modulation in which the amplitude and phase of the carrier wave are modulated directly. Polar modulation schemes are often viewed as being better suited to high power levels relative to linear modulation schemes. Unfortunately, polar modulation typically performs poorly at low power levels.

SUMMARY

This disclosure describes companded transmit path techniques that may be implemented in a wireless communication device. The techniques may reduce power consumption by a wireless modulator in the transmit path of the device. In addition, the techniques may improve signal modulation performance in a wireless communication device. The techniques may be applicable to linear modulation schemes such as 16 QAM, 64 QAM, and other types of linear modulation schemes. In these cases, a signal is represented by phase (I) and quadrature phase (Q) components of a transmit signal at baseband. The I and Q components are converted to analog signals, which are modulated onto a carrier waveform. In accordance with this disclosure, however, the I and Q components are compressed at baseband prior to modulation, and an emphasis envelope is generated to represent this compression. The compressed I and Q components are then converted to analog signals, modulated and amplified. This performance specifications associated with analog processing components may be relaxed due to the I and Q compression that occurs at baseband. Following the processing, the processed I and Q signals can be expanded by the emphasis envelope signal, which is generated from the emphasis envelope. In this manner, the emphasis envelope signal serves to expand the processed I and Q signals, removing the compression prior to transmission of the I and Q signals over the air interface.

In one example, this disclosure provides a wireless communication device (WCD) comprising processor that compresses I and Q components of a transmit signal, and generates an emphasis envelope based on the I and Q components, one or more digital-to-analog converters (DACs) that convert the compressed I and Q components to compressed I and Q signals and convert the emphasis envelope to an emphasis envelope signal, and a modulator that modulates the compressed I and Q signals onto a carrier waveform, and expands the modulated carrier waveform based on the emphasis envelope signal.

In another example, this disclosure provides an apparatus of a WCD comprising a processor that compresses I and Q components of a transmit signal, and generates an emphasis envelope based on the I and Q components, one or more digital-to-analog converters (DACs) that convert the compressed I and Q components to compressed I and Q signals and convert the emphasis envelope to an emphasis envelope signal, a modulator that modulates the compressed I and Q signals onto a carrier waveform, and expands the modulated carrier waveform based on the emphasis envelope signal.

In another example, this disclosure provides a device comprising means for compressing I and Q components of a transmit signal, means for generating an emphasis envelope based on the I and Q components, means for converting the compressed I and Q components to compressed I and Q signals, means for converting the emphasis envelope to an emphasis envelope signal, means for modulating the compressed I and Q signals onto a carrier waveform, and means for expanding the modulated carrier waveform with the emphasis envelope signal.

In another example, this disclosure provides a method comprising compressing I and Q components of a transmit signal, generating an emphasis envelope based on the I and Q components, converting the compressed I and Q components to compressed I and Q signals, converting the emphasis envelope to an emphasis envelope signal, modulating the compressed I and Q signals onto a carrier waveform, and expanding the carrier waveform based on the emphasis envelope signal.

Additional details of various examples are set forth in the accompanying drawings and the description below. Other features, objects and advantages will become apparent from the description and drawings, and from the claims.

DETAILED DESCRIPTION

Figure 1:
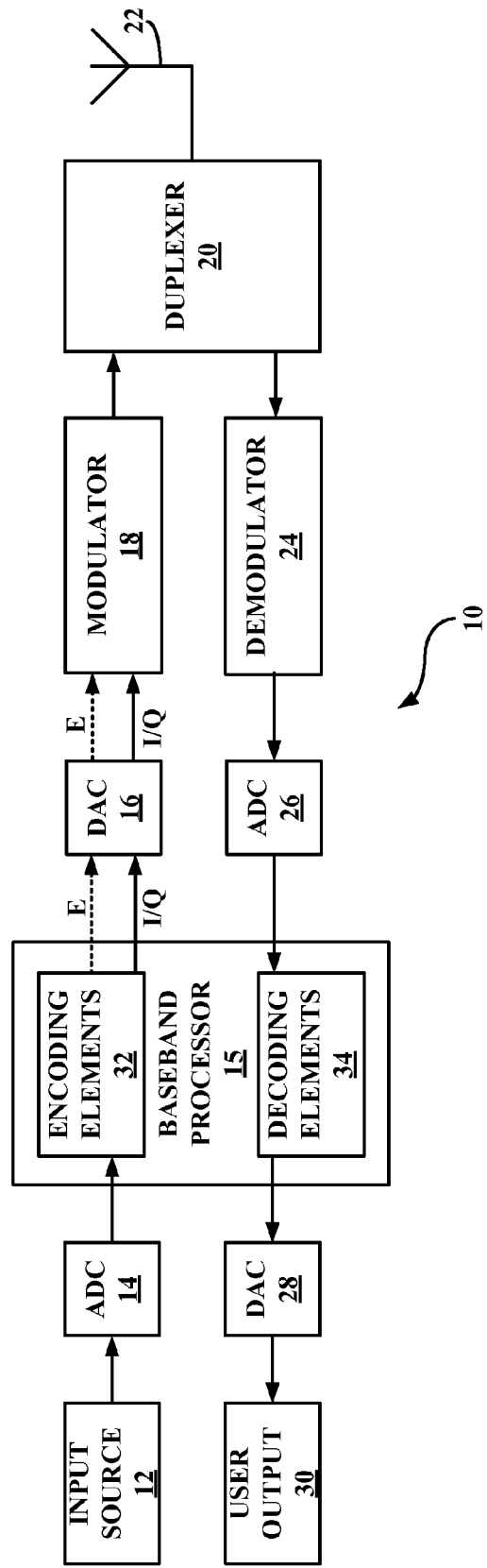
FIG. 1 is a block diagram of a wireless communication device (WCD) that may include a companded transmit path architecture in accordance with this disclosure.

This disclosure describes companded transmit path techniques that may be implemented in a wireless communication device to reduce power consumption and simply signal modulation. The techniques of this disclosure may be applicable to linear modulation schemes such as 16 QAM, 64 QAM, as well as many other types of linear modulation schemes. In these cases, signal coding is performed by generating digital in phase (I) and quadrature phase (Q) components of a transmit signal at baseband. The I and Q components are converted to analog signals, which are modulated onto a carrier waveform. The techniques of this disclosure can significantly reduce the dynamic range necessary to facilitate the analog processing of I and Q signals during signal modulation.

The techniques may be particularly useful for third generation (3G), three and a half generation (3.5G) and fourth generation (4G) modulation protocols for wireless communication, as well as existing or future modulation protocols that rely on orthogonal frequency division multiplexing (OFDM). In OFDM, signals typically exhibit high peak-to-average power ratios (P2APR) because of the independent phases of the multiple sub-carriers that often combine constructively. The handling of high P2APR typically requires a very linear signal path with large dynamic range. The techniques of this disclosure may achieve linear signal paths without needing a large dynamic range, and can achieve these goals in a power efficient manner.

In accordance with this disclosure, the baseband I and Q components are compressed prior to digital-to-analog conversion to reduce the dynamic range of the baseband transmit signal. An emphasis envelope is generated to represent the compression of the I and Q components so that the compressed I and Q components can later be expanded. The compressed I and Q components of the transmit signal are converted to analog signals and processed. This analog processing may include the mixing process in which the compressed I and Q signals are modulated onto a carrier waveform (sometimes called upconversion). Alternatively or additionally, the analog processing may include various other signal processing, such as filtering, scaling, or other typical signal processing. In any case, the analog processing performance requirements can be can be simplified due to the I and Q compression that occurs at baseband. In particular, as mentioned above, the I and Q compression reduces the dynamic range of the transmit signal.

Following the processing, the emphasis envelope can be used to expand the upconverted I and Q components. This expansion increases the dynamic range of the upconverted I and Q components. In some cases, the expansion may be configured to substantially restore the I and Q components to the original dynamic range that existed prior to compression. For example, the carrier waveform modulated with the I and Q signals may be scaled via a power amplifier that applies the emphasis envelope signal as its gain. In this way, the emphasis envelope can be added back after the I and Q signals are processed. Accordingly, processing advantages associated with I and Q compression can be realized, and following the processing, the compression can be substantially removed. Specifically, the emphasis envelope signal can be used to expand the upconverted I and Q signals in the carrier waveform (e.g., essentially removing the compression) prior to transmission of the carrier waveform modulated with the I and Q information over an air interface.

FIG. 1 is an exemplary block diagram illustrating components of a wireless communication device (WCD) 10 that may implement the techniques of this disclosure. The components illustrated in FIG. 1 are merely exemplary, and in some cases, one or more of the illustrated components may be optional. WCD 10 may comprise a cellular or satellite radiotelephone, a radiotelephone base station, a computer that supports one or more wireless protocols or wireless networking standards, a wireless access point for wireless networking, a PCMCIA card incorporated within a portable computer, a wireless data terminal, a wireless data collection device, a direct two-way communication device (sometimes called a "walkie-talkie"), a personal digital assistant (PDA) equipped with wireless communication capabilities, and the like.

WCD 10 includes various signal and/or data processing subcomponents, each of which may be implemented by one or more hardware elements, software elements, firmware elements, or a combination hardware, software and firmware. The functionality of the components illustrated in FIG. 1 is described in greater detail below. Again, however, one or more of the illustrated components may be optional in the implementation of the techniques of this disclosure.

As shown in FIG. 1, WCD 10 may include an input source 12, an analog-to-digital converter (ADC) 14, a baseband processor 15, a digital to analog-converter (DAC) 16, a modulator 18, a duplexer 20 and an antenna 22. In addition, WCD 10 may include a demodulator 24, another ADC 26, another DAC 28, and user output element 30.

Baseband processor 15 is coupled to input source 12 via ADC 14, and also coupled to a user output 12 via DAC 28. Baseband processor 15 is coupled to a modulator 18 via a different DAC 16, which may represent several DACs for the various signals that pass from baseband processor 15 to modulator 18. Additionally, baseband processor 15 is coupled to demodulator 24 via ADC 26. ADC 26 more generally represents one or several ADCs. Modulator 18 and demodulator 24 are selectively coupled to an antenna 22 by a duplexer 20.

Input source 12 may comprise a microphone, a wireless internet connection, modem, or other source of data to be coded, modulated onto a carrier, and transmitted to another device. The user output element 30 may comprise a device or element that presents information to a user of device 10. As examples, user output element 30 may comprise an audio speaker, a visual display, modem, and/or other type of user interface.

ADC 14 converts analog signals from the input source 12 into digital samples, which are provided to baseband processor 15. Conversely, DAC 28 converts digital samples from baseband processor 15 into analog signals for the user output element 30. ADC 14 may be implemented by any of a wide variety of conversion circuits that convert analog signals to digital samples. Similarly, DAC 28 may be implemented by any of a wide variety of conversion circuits that convert digital samples to an analog signal.

Baseband processor 15 may be implemented via one or more central processing units (CPUs) commonly utilized in commercially available wireless cellular telephones. As an example, the baseband processor 15 may comprise a combination of microprocessor, digital signal processor, and various custom logic components. Baseband processor 15 may include encoder elements 32 (which may be a software routine) that handle the encoding of baseband signals, and decoder elements 34 (which may be a software routine) that handle the decoding of received baseband signals. Baseband processor 15 may also include a controller (not illustrated) to handle the general operation of baseband processor 15. Also, in other examples, separate baseband processors may be implemented for the transmit and receive paths.

The encoder elements 32 of baseband processor 15 may apply a digital encoding scheme to input signals sampled from input source 12. By way of example, the input signals may comprise voice signals. The encoder elements 32 may utilize one or more encoding technique such as code division multiple access (CDMA), time division multiple access (TDMA), orthogonal frequency division multiplexing (OFDM), or another technique for transforming raw data into a form that is suitable for wireless transmission.

Decoder elements 34 of baseband processor 15 typically perform the opposite function of encoder elements 32. For instance, decoder elements 34 may perform the decoding of received signals (e.g., coded according to CDMA, TDMA and/or OFDM coding) from received signals that are demodulated by demodulator 20. Decoding elements 34 can provide decoded voice or other decoded output signals to user output element 30 via DAC 28.

Baseband processor 15 may comprise a variety of other routines used in wireless communication, such as a routine that adjusts transmit power levels of device 10. For instance, device 10 may use higher transmit power levels when the device 10 is communicating with more distant remote stations, or over channels with more ambient noise or interference. In this case, baseband processor 15 may dictate higher power levels for communication with distant stations or communication in noisy environments. Conversely, baseband processor 15 may dictate lower transmit power levels when device 10 is communicating with nearby remote stations, or over channels with less interference. The level of required transmit power may be determined, for example, by evaluating the strength or weakness of received signals using any of a number of power estimation or channel estimation techniques. Baseband processor 15 may issue commands to modulator 18 in order to implement or adjust to a selected transmit power level.

Furthermore, according to this disclosure, baseband processor 15 compresses in phase (I) and quadrature phase (Q) components of a digital baseband signal. I and Q components are common for linear modulation schemes such as 16 QAM, 64 QAM, or other linear modulation schemes. Baseband processor 15 may generate I and Q components in performing the linear coding scheme. According to this disclosure, encoding elements 32 of baseband processor compress the I and Q components and generates an emphasis envelope, which is generally indicative of the compression. Both the I and Q components (I/Q) and the emphasis envelope (E) are converted to analog signals via DAC 16, which may represent several DACs, e.g., one or more DACs for the I components, one or more additional DACs for the Q components and one or more additional DACs for the emphasis envelope.

The compression of the I and Q components allows modulator 18 to perform the majority of its analog processing on the compressed I and Q components, which can reduce power consumption and simplify components used for signal processing, particularly for high power signals. The compressed signals may exhibit reduced dynamic range relative to non-compressed signals. This reduced dynamic range allows the design of modulator 18 to be simplified. Generally, baseband processor 15 compresses I components and Q components and generates emphasis envelope based on the respective values of the I and Q components. One or more DACs 16 convert the compressed I and Q components to compressed I and Q signals and convert the emphasis envelope to an emphasis envelope signal. Modulator 18 then modulates the compressed I and Q signals onto a carrier waveform and expands the modulated carrier waveform with the emphasis envelope signal.

In some cases, baseband processor 15 performs compression of I and Q components in a selective manner. In particular, compression may be avoided for low power signals, but used for high power signals. Baseband processor 15 may apply a power level threshold to determine whether compression of the I and Q components is desirable. The values of the different components may be used to make this power level determination. If the power levels expressed in the values of the I and Q components exceed a power level threshold, baseband processor 15 may perform the compression and create the emphasis envelope. If the power levels do not exceed the power level threshold, however, compression may be avoided, and the generation of emphasis envelope may be avoided. The signal paths through device 15, however, may be the same, avoiding complicated switching, e.g., between different types of modulation schemes for high power or low power scenarios.

Whenever baseband processor 15 compresses the I and Q components, baseband processor 15 generates an emphasis envelope to convey the nature of this compression for use in later expansion. The analog processing, which is performed by modulator 18, may include the mixing process in which the compressed I and Q signals are modulated onto a carrier waveform to produce a modulated waveform that is modulated with the compressed I and Q signals. Alternatively or additionally, the analog processing may include filtering, scaling, or other signal processing. In any case, the analog processing of modulator 18 can be simplified due to the I and Q compression that occurs at baseband, which can reduce the dynamic range needed for modulation. Whenever baseband processor 15 does not perform any compression of the I and Q components, the I and Q signal paths through modulator 18 may remain the same. In this case, however, there are no emphasis envelope and no emphasis envelope signal, or alternatively, a unity envelope may be generated to convey that no compression occurred.

In the case where compression is performed on the I and Q components, following the analog processing of the compressed I and Q signals, the processed I and Q signals can be expanded with an emphasis envelope signal, which is generated by DAC 16 from the emphasis envelope. For example, the processing performed by modulator 18 may include a mixing process in which a carrier waveform modulated with the compressed I and Q signals. Following this mixing process, the modulated carrier may be scaled according to the emphasis envelope signal. In this way, the emphasis envelope can be added back to the modulated carrier after the compressed I and Q signals are modulated onto the carrier.

WCD 10 may include many other components, which are not illustrated for simplicity. These components may include drivers, up-converter circuits, power circuits, amplifiers, and any of a variety of other components common in wireless communication devices. Demodulator 24 and modulator 18 are both coupled to duplexer 20, which is coupled to the antenna 23. Duplexer 24 directs received signals from the antenna 23 to the demodulator 24, and in the opposite direction, directs transmit signals from modulator 18 to antenna 23. Alternatively, a switch (not shown) may be substituted for the duplexer for examples utilizing TDMA or other encoding that use the same frequency but different time slots to send and receive data. In still other cases, separate antennas may be used for transmitting and receiving, in which case duplexer 20 may be omitted entirely. In still other examples, the techniques of this disclosure may be performed by a device that only modulates and transmits signals, and does not receive or demodulate signals. In this case, the whole receive path shown in FIG. 1 may be omitted.

Figure 2:
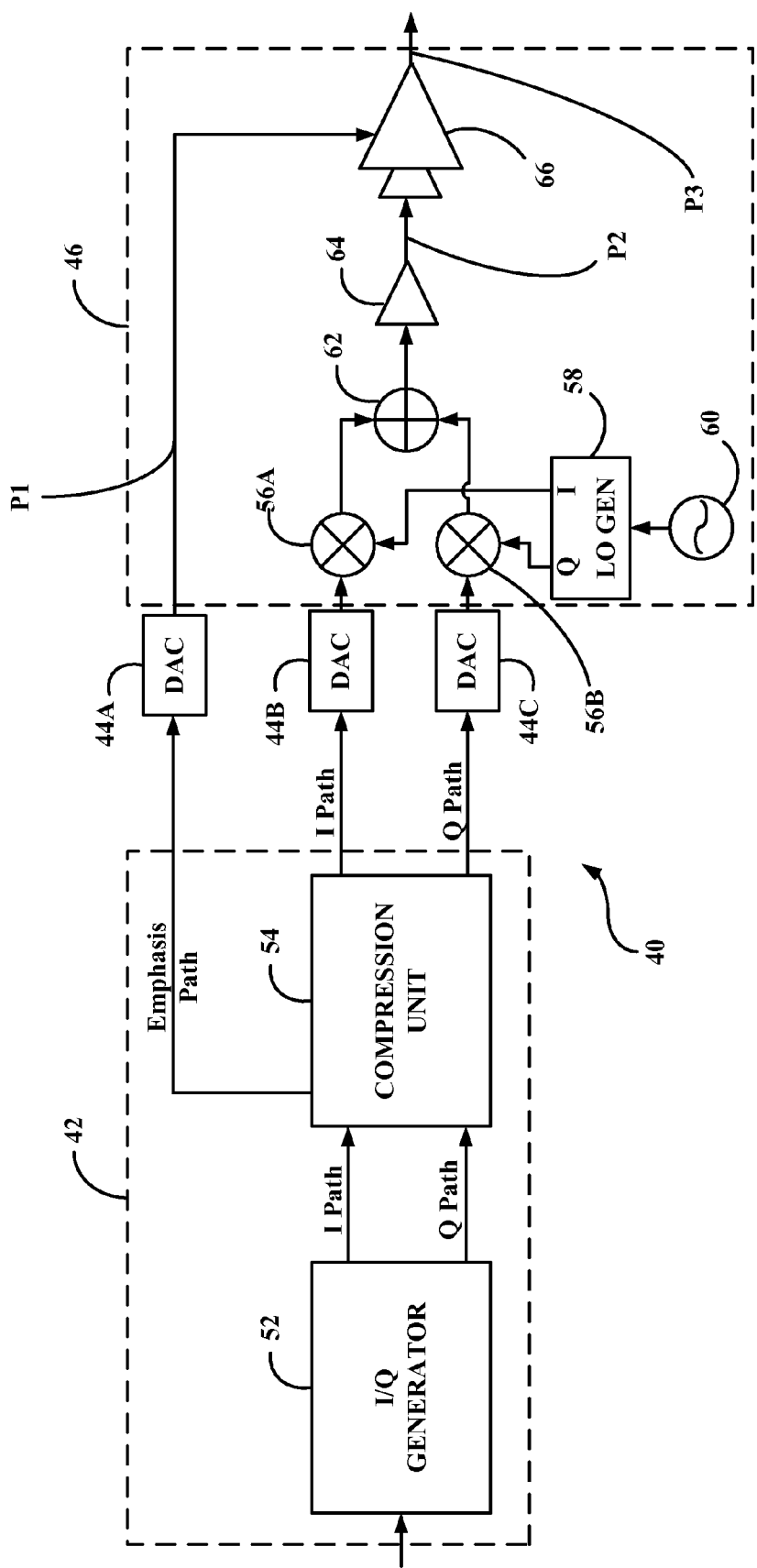
FIG. 2 is a block diagram illustrating an apparatus, which may comprise an implementation of various components of the WCD shown in FIG. 1.

FIG. 2 is a block diagram of an apparatus 40 that may be used in a WCD. The components of apparatus 40 may correspond to components of WCD 10 shown in FIG. 1, or alternatively, apparatus 40 could be used in a different WCD architecture. As an example, digital processor 42 of apparatus 40 may correspond to baseband processor 15 of WCD 10. DACs 44A, 44B and 44C of apparatus 40 may correspond to DAC 16 of WCD 10. Analog circuit 46 of apparatus 40 may correspond to modulator 18 of WCD 10.

Digital processor 42 receives input, and I/Q generator 52 generates in phase (I) and quadrature phase (Q) components of a transmit signal. The I and Q components may comprise digital samples within processor 42. Compression unit 54 receives the I and Q components via an I path and a Q path shown in FIG. 2. Compression unit 54 performs compression on the I and Q components to generate compressed I and Q components, which continue to follow I path and Q paths, respectively. This compression may compress the amplitude and phase of the components, and may be referred to compression of the input complex at baseband.

At the time of compression of each I and Q component, compression unit 54 generates an emphasis envelope, which may comprise digital samples generally indicative of the compression of I and Q component pairs. The emphasis envelope, for example, may comprise samples representing the average energy associated with each successive pair of I and Q components. The emphasis envelope follows the emphasis envelope path shown in FIG. 2 and is synchronized with the corresponding I and Q paths. This synchronization ensures that when the emphasis envelope is added back to the I and Q signals, the proper output is obtained.

Again, as noted above, the compression of I and Q components may be selective such that the compression is only performed when the I and Q components exceed a power threshold. Avoiding compression of low power components, for example, may be highly desirable in order to maintain higher levels of resolution in low power scenarios. In high power scenarios, which typically yield large peak to average (P2A) waveforms, compression of the I and Q components may be desirable to maintain linearity in the signal processing without requiring substantial increases in power consumption.

DACs 44A, 44B and 44C convert the emphasis envelope and the compressed I and Q components to analog signals, which are sent to analog circuit 46. Analog circuit performs analog processing on the compressed I and Q signals, or on non-compressed I and Q signals for the low power cases where compression is avoided. Specifically, this analog processing may include a mixing process in which the compressed I and Q signals are modulated onto a carrier waveform. To perform such mixing, analog circuit 46 may include multiplier elements 56A and 56B that operate with respect to the compressed I and Q signals, followed by an adder 62 that combines the multiplied signals. Multiplier elements 56A and 56B receive the carrier waveform from local oscillator generation unit (LO GEN) 58 for the Q and I components. A local oscillator 60, such as a voltage controlled oscillator (VCO), may generate the carrier waveforms for LO GEN 58, which are then multiplied with the I and Q signals via multiplier units 56A and 56B. Adder unit 62 combines the output of multiplier units 56A and 56B. The output of adder unit 62 is a carrier waveform modulated with the I and Q information (which may be compressed). The output of adder unit 62 is provided to a driver amplifier 64 followed by a power amplifier 66.

In the case where the I and Q components have been compressed, the emphasis envelope signal from DAC 44A controls the gain to power amplifier 66. For example, the expansion may be performed by applying the emphasis envelope signal to a power supply of power amplifier 66, or to a linear gain control input to power amplifier 66. In these ways, the modulated waveform can be scaled by the emphasis envelope signal to increase its peak to average (P2A) power level, and essentially remove the compression that occurred on the I and Q information. In the case where compression to the I and Q components was avoided, the gain to power amplifier 66 may be set to unity (1), e.g., essentially avoiding any scaling of the output waveform.

In one example, compression unit 54 compress the I and Q components substantially according to the following compression algorithm (referred to herein as the "A-law" algorithm):

$$F(x)=\text{sign}(x)\begin{cases} A|x|\text{over }1+\ln(A), & |x|<\{1\text{ over }A\}\text{frac}\{1+\ln(A|x|)\}\{1+\ln(A)\}, & \{1\text{ over }A\}\text{leq}|x|\text{leq }1\end{cases},$$

where x represents the I or Q input, A is a compression parameter and leq is a less than or equal to function. The emphasis envelope comprises $\sqrt{I^2+Q^2}$ transformed by an inverse of the compression algorithm.

In the A-Law Algorithm, the corresponding expansion is given by the inverse function, where y represents the input to be expanded:

$$F^{\{-1\}}(y)=\text{sgn}(y)\begin{cases} |y|(1+\ln(A))\text{over }A\}, & |y|<\{1\text{ over }1+\ln(A)\}\{\exp(|y|(1+\ln(A))-1)\text{over }A\}, & \{1\text{ over }1+\ln(A)\}\text{leq}|y|<1\end{cases}$$

A-Law encoding effectively reduces the dynamic range of the signal, thereby increasing the coding efficiency and resulting in a signal-to-distortion ratio that is superior to that obtained without compression for a given number of bits.

In another example, compression unit 54 compress the I and Q components substantially according to the following compression algorithm (referred to herein as the "μ-law" algorithm):

$$F(x)=\text{sign}(x)\text{frac}\{\ln(1+\mu|x|)\}\{\ln(1+\mu)\}-1\text{ leq }x\text{ leq }1,$$

where x represents I or Q input, $\mu=2\hat{\ }n$, and n=a number of bits of a respective I or Q component. Like the A-law algorithm, for the μ-law algorithm, the emphasis envelope may comprise $\sqrt{I^2+Q^2}$ transformed by an inverse of the compression algorithm. The L-law expansion is given by the inverse equation, where y represents the input to be expanded:

$$F^{\{-1\}}(y)=\text{sgn}(y)(1/\mu)[(1+\mu)\hat{\ }-1]-1\text{leq }y\text{ leq }1>$$

Figure 3:
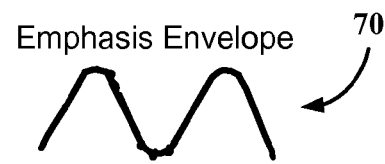
FIG. 3 is an illustration of an exemplary emphasis envelope signal representing compression of I and Q components in a companded transmit path.

FIG. 3 is an illustration of an exemplary emphasis envelope signal 70. Emphasis envelope signal 70 typically comprises a low frequency information signal. Emphasis envelope signal 70 may comprise a sinusoidal-shaped or other periodic waveform. Emphasis envelope signal 70 would typically appear in FIG. 2 at point P1.

Figure 4:
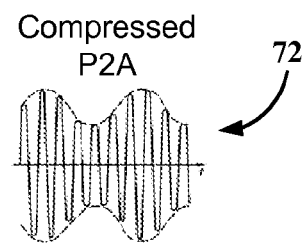
FIG. 4 is an illustration of an exemplary carrier wave modulated with compressed I and Q signals.

FIG. 4 is an illustration of an exemplary carrier wave 72 modulated with compressed I and Q signals. The modulated I and Q signals have a substantially compressed peak to average (P2A) values. Carrier wave 72 modulated with compressed I and Q signals typically appear in FIG. 2 at point P2.

Figure 5:
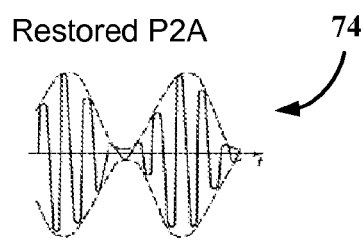
FIG. 5 is an illustration of an exemplary carrier wave modulated with compressed I and Q signals following expansion with the emphasis envelope signal of FIG. 3.

FIG. 5 is an illustration of an exemplary carrier wave 74 modulated with compressed I and Q signals following expansion with an emphasis envelope signal typically appear in FIG. 5 at point P3. In this case, the modulated I and Q signals are no longer compressed, and have P2A values that are expanded to levels expected without compression of the I and Q signals, although less or greater expansion might also be used in some cases. Carrier wave 74 modulated with compressed I and Q signals typically appear in FIG. 2 at point P2.

Figure 6:
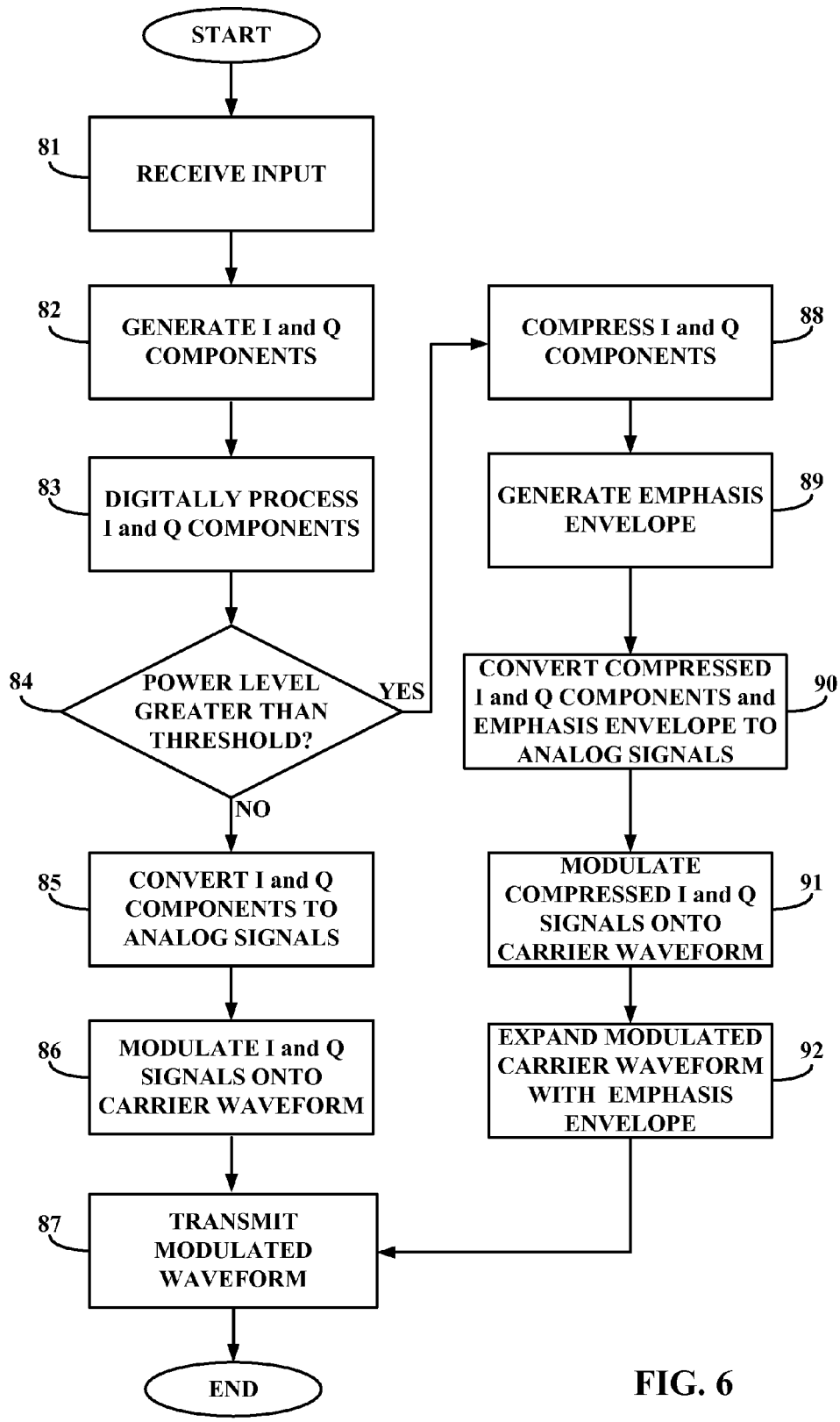
FIG. 6 is a flow diagram illustrating an exemplary technique for companded transmission of wireless signals in accordance with this disclosure.

FIG. 6 is a flow diagram illustrating a technique consistent with this disclosure. As shown in FIG. 6, a digital processor 42 receives input (81) and invokes I/Q generator 52 to generate I and Q components of a transmit signal (82). The I and Q components may be digitally processed (83), and processor 42 determines whether a power level of the I and Q components is greater than a pre-defined threshold (84). If the power level of the I and Q components is not greater than the threshold (no branch of 84), the components are processed in a normal manner. In this case, DACs 44B and 44C convert the I and Q components to analog signals (85), and analog circuit 46 modulates the I and Q signals onto a carrier waveform (86). The modulated waveform can then be transmitted wirelessly (87) to another device to convey the coded I and Q information that is modulated on the waveform. A duplexer and antenna (not shown in FIG. 2) or other transmitter architecture can be used to facilitate the transmission of the waveform.

If the power level of the I and Q components is greater than the threshold (yes branch of 84), the I and Q components are compressed. In this case, compression unit 54 compresses the I and Q components (88), and generates an emphasis envelope indicative of this compression (89). Compression unit 54 may apply the A-law algorithm (explained above), the L-law algorithm (explained above), or another algorithm to achieve this compression. DACs 44A, 44B and 44C then covert the emphasis envelope and the compressed I and Q components to analog signals (91). Analog circuit 46 modulates the compressed I and Q signals onto a carrier waveform (91). Then, analog circuit 46 expands the modulated carrier waveform with the emphasis envelope (92), e.g., by applying the emphasis envelope signal as a gain to the carrier waveform modulated with the I and Q signals.

A number of examples have been described. In particular, compression techniques in the linear modulation of I and Q components of a transmit signal have been described. The techniques may be implemented in a wireless communication device to reduce power consumption and possibly simplify components needed for effective signal modulation particularly at high power levels. In particular, the techniques can significantly reduce the dynamic range necessary to facilitate the analog processing for signal modulation. The various aspects of the techniques described herein may be executed in hardware, software, firmware, or any combination thereof. Nevertheless, various modifications may be made to the techniques described without departing from the scope of the following claims. Accordingly, the specific examples described above, and other examples are within the scope of the following claims.

The invention claimed is:

1. A wireless communication device (WCD) comprising:
   a processor that selectively compresses in-phase (I) and quadrature phase (Q) components of a transmit signal, and selectively generates an emphasis envelope based on the I and Q components;
   one or more digital-to-analog converters (DACs) that convert the compressed I and Q components to compressed I and Q signals and selectively convert the emphasis envelope to an emphasis envelope signal; and
   a modulator that modulates the compressed I and Q signals onto a carrier waveform, and selectively expands the modulated carrier waveform based on the emphasis envelope signal.

2. The WCD of claim 1, wherein the processor includes an I/Q generator that generates the I and Q components and a compression unit that compresses the I and Q components and generates the emphasis envelope based on the I and Q components.

3. The WCD of claim 1, wherein the processor determines whether power associated with the I and Q components exceeds a threshold and compresses the I and Q components only when the power exceeds the threshold.

4. The WCD of claim 3, wherein when the power associated with the I and Q components does not exceed the threshold:
   the DACs convert the I and Q components to I and Q signals; and the modulator modulates the I and Q signals onto the carrier waveform.

5. The WCD of claim 1, wherein the modulator includes a power amplifier that applies the emphasis envelope signal as a gain to expand the modulated carrier waveform.

6. The WCD of claim 1, wherein the modulator includes a mixer unit that modulates the compressed I and Q signals onto the carrier waveform.

7. The WCD of claim 6, wherein the WCD includes a duplexer that transmits the modulated carrier waveform via an antenna.

8. The WCD of claim 1, wherein the processor compresses the I and Q components substantially according to the following compression algorithm:

$$F(x) = \text{sign}(x)\begin{cases} A|x| \text{over } 1+\ln(A), & |x| < \{1 \text{ over } A\}\text{frac}\{1+\ln(A|x|)\}\{1+\ln(A)\}, & \{1 \text{ over } A\} \leq |x| \leq 1 \end{cases},$$

where x represents I or Q input, A is a compression parameter and leq is a less than or equal to function.

9. The WCD of claim 8, wherein the emphasis envelope comprises:
   $\sqrt{I^2+Q^2}$ transformed by an inverse of the compression algorithm.

10. The WCD of claim 1, wherein the processor compresses the I and Q components substantially according to the following compression algorithm:

$$F(x) = \text{sign}(x)\text{frac}\{\ln(1+\mu|x|)\}\{\ln(1+\mu)\} - 1 \leq x \leq 1,$$

where x represents I or Q input, $\mu = 2^n$, and n=a number of bits of a respective I or Q component.

11. The WCD of claim 10, wherein the emphasis envelope comprises:
   $\sqrt{I^2+Q^2}$ transformed by an inverse of the compression algorithm.

12. The WCD of claim 1, wherein the emphasis envelope signal comprises a periodic waveform.

13. An apparatus of a wireless communication device comprising:
   a processor that selectively compresses in-phase (I) and quadrature phase (Q) components of a transmit signal, and selectively generates an emphasis envelope based on the I and Q components;
   one or more digital-to-analog converters (DACs) that convert the compressed I and Q components to compressed I and Q signals and selectively convert the emphasis envelope to an emphasis envelope signal; and
   a modulator that modulates the compressed I and Q signals onto a carrier waveform, and selectively expands the modulated carrier waveform based on the emphasis envelope signal.

14. The apparatus of claim 13, wherein the processor includes an I/Q generator that generates the I and Q components and a compression unit that compresses the I and Q components and generates the emphasis envelope based on the I and Q components.

15. The apparatus of claim 13, wherein the processor determines whether power associated with the I and Q components exceeds a threshold and compresses the I and Q components only when the power exceed the threshold.

16. The apparatus of claim 15, wherein when the power associated with the I and Q components does not exceed the threshold:
   the DACs covert the I and Q components to I and Q signals; and the modulator modulates the I and Q signals onto the carrier waveform.

17. The apparatus of claim 13, wherein the modulator includes a power amplifier that applies the emphasis envelope signal as a gain to expand the modulated waveform.

18. The apparatus of claim 13, wherein the modulator includes a mixer unit that modulates the compressed I and Q signals onto the carrier waveform.

19. The apparatus of claim 13, wherein the processor compresses the I and Q components substantially according to the following compression algorithm:

$$F(x)=\text{sign}(x)\begin{cases}A|x| \text{over } 1+\ln(A), & |x|<\{1 \text{ over } A\}\text{frac}\{1+\ln(A|x|)\}\{1+\ln(A)\}, & \{1 \text{ over } A\}\text{leq}|x|\text{leq } 1 \end{cases},$$

where x represents I or Q input, A is a compression parameter and leq is a less than or equal to function.

20. The apparatus of claim 19, wherein the emphasis envelope comprises:
$\sqrt{I^2+Q^2}$ transformed by an inverse of the compression algorithm.

21. The apparatus of claim 13, wherein the processor compresses the I and Q components substantially according to the following compression algorithm:

$$F(x)=\text{sign}(x)\text{frac}\{\ln(1+\mu|x|)\}\{\ln(1+\mu)\}{-1} \text{ leq } x \text{ leq } 1,$$

where x represents I or Q input, $\mu=2^n$, and n=a number of bits of a respective I or Q component.

22. The apparatus of claim 21, wherein the emphasis envelope comprises:
$\sqrt{I^2+Q^2}$ transformed by an inverse of the compression algorithm.

23. The apparatus of claim 13, wherein the emphasis envelope comprises a periodic waveform.

24. A device comprising:
means for selectively compressing in phase (I) and quadrature phase (Q) components of a transmit signal;
means for selectively generating an emphasis envelope based on the I and Q components;
means for converting the compressed I and Q components to compressed I and Q signals;
means for selectively converting the emphasis envelope to an emphasis envelope signal;
means for modulating the compressed I and Q signals onto a carrier waveform; and
means for selectively expanding the modulated carrier waveform with the emphasis envelope signal.

25. The device of claim 24, further comprising means for generating the I and Q components.

26. The device of claim 24, further comprising means for determining whether power associated with the I and Q components exceeds a threshold, wherein compression of the I and Q components occurs only when the power exceed the threshold.

27. The device of claim 26, wherein when the power associated with the I and Q components does not exceed the threshold:
the means for converting the compressed I and Q components converts the I and Q components to I and Q signals; and
means for processing the compressed I and Q signals processes the I and Q signals.

28. The device of claim 24, wherein the means for expanding includes a power amplifier that applies the emphasis envelope signal as a gain to the modulated waveform.

29. The device of claim 24, wherein the means for modulating includes a mixer unit that modulates the compressed I and Q signals onto the carrier waveform.

30. The device of claim 29, further comprising means for transmitting the modulated carrier waveform via an antenna.

31. The device of claim 24, wherein the means for compressing compresses the I and Q components substantially according to the following compression algorithm:

$$F(x)=\text{sign}(x)\text{begin}\{cases\}\{A|x| \text{over } 1+\ln(A)\}, \& |x|<\{1 \text{ over } A\}\text{frac}\{1+\ln(A|x|)\}\{1+\ln(A)\}, \& \{1 \text{ over } A\}\text{leq}|x|\text{leq } 1 \text{ end}\{cases\},$$

where x represents I or Q input, A is a compression parameter and leq is a less than or equal to function.

32. The device of claim 31, wherein the means for generating the emphasis envelope applies the following equation:
$\sqrt{I^2+Q^2}$, transformed by an inverse of the compression algorithm.

33. The device of claim 24, wherein the means for compressing compresses the I and Q components substantially according to the following compression algorithm:

$$F(x)=\text{sign}(x)\text{frac}\{\ln(1+\mu|x|)\}\{\ln(1+\mu)\}{-1} \text{ leq } x \text{ leq } 1,$$

where x represents I or Q input, $\mu=2^n$, and n=a number of bits of a respective I or Q component.

34. The device of claim 33, wherein the means for generating the emphasis envelope applies the following equation:
$\sqrt{I^2+Q^2}$, transformed by an inverse of the compression algorithm.

35. The device of claim 24, wherein the emphasis envelope signal comprises a periodic waveform.

36. A method comprising:
selectively compressing in phase (I) and quadrature phase (Q) components of a transmit signal;
selectively generating an emphasis envelope based on the I and Q components;
converting the compressed I and Q components to compressed I and Q signals;
selectively converting the emphasis envelope to an emphasis envelope signal;
modulating the compressed I and Q signals onto a modulated carrier waveform; and
selectively expanding the modulated carrier waveform based on the emphasis envelope signal.

37. The method of claim 36, further comprising generating the I and Q components.

38. The method of claim 36, further comprising determining whether power associated with the I and Q components exceeds a threshold, wherein compressing the I and Q components occurs only when the power exceed the threshold.

39. The method of claim 38, wherein when the power associated with the I and Q components does not exceed the threshold, the method further comprising: converting the I and Q components to I and Q signals; and modulating the I and Q signals onto the modulated carrier waveform.

40. The method of claim 36, wherein a power amplifier applies the emphasis envelope signal as a gain to the modulating waveform.

41. The method of claim 36, wherein a mixer unit modulates the compressed I and Q signals onto the modulated carrier waveform.

42. The method of claim 41, further comprising transmitting the modulated carrier waveform via an antenna.

43. The method of claim 36, wherein compressing the I and Q components comprises substantially applying the following compression algorithm:

$$F(x) = \text{sign}(x) \begin{cases} \dfrac{A|x|}{1+\ln(A)}, & |x| < \dfrac{1}{A} \\ \dfrac{1+\ln(A|x|)}{1+\ln(A)}, & \dfrac{1}{A} \leq |x| \leq 1 \end{cases},$$

where x represents I or Q input, A is a compression parameter and leq is a less than or equal to function.

44. The method of claim 43, wherein generating the emphasis envelope comprises substantially applying:

$\sqrt{I^2+Q^2}$ transformed by an inverse of the compression algorithm.

45. The method of claim 36, wherein compressing the I and Q components comprises substantially applying the following compression algorithm:

$$F(x) = \text{sign}(x) \frac{\ln(1+\mu|x|)}{\ln(1+\mu)} \quad -1 \leq x \leq 1,$$

where x represents I or Q input, $\mu = 2^n$, and n = a number of bits of a respective I or Q component.

46. The method of claim 45, wherein generating the emphasis envelope comprises substantially applying:

$\sqrt{I^2+Q^2}$ transformed by an inverse of the compression algorithm.

47. The method of claim 36, wherein the emphasis envelope signal comprises a periodic waveform.

* * * * *